(12) United States Patent
Meyer

(10) Patent No.: US 7,344,199 B2
(45) Date of Patent: Mar. 18, 2008

(54) PRIMARY/SECONDARY BRAKE SYSTEM

(75) Inventor: Duane Fredrick Meyer, Hudson, IA (US)

(73) Assignee: Deere & Company, Moline, IL (US)

( * ) Notice: Subject to any disclaimer, the term of this patent is extended or adjusted under 35 U.S.C. 154(b) by 301 days.

(21) Appl. No.: 11/080,011

(22) Filed: Mar. 15, 2005

(65) Prior Publication Data
US 2006/0208562 A1 Sep. 21, 2006

(51) Int. Cl.
*B60T 13/16* (2006.01)
(52) U.S. Cl. .................. 303/10; 303/9.61; 188/72.4; 188/106 P
(58) Field of Classification Search .................. 303/10, 303/9.61, 9.65, 113.1, 116.1, 119.1; 188/72.4, 188/72.5, 73.1, 106 P, 106 F, 106 R, 345
See application file for complete search history.

(56) References Cited

U.S. PATENT DOCUMENTS

| 3,386,775 | A | 6/1968 | Jones | 303/2 |
| 4,598,954 | A | 7/1986 | Hayashi | 303/6 A |
| 5,544,946 | A | 8/1996 | Toyoda et al. | 303/9.64 |
| 5,700,067 | A | 12/1997 | Heubner | 303/9 |
| 6,092,877 | A | 7/2000 | Rasidescu et al. | 303/9.61 |
| 6,309,029 | B1 | 10/2001 | Wakabayashi et al. | 303/9.64 |
| 6,338,533 | B1 | 1/2002 | Wakabayashi et al. | 303/9.64 |
| 6,592,190 | B2 | 7/2003 | Dunbar et al. | 303/9.61 |
| 2002/0011386 | A1 | 1/2002 | Tani et al. | 188/106 P |

FOREIGN PATENT DOCUMENTS

JP 57-130851 8/1982

*Primary Examiner*—Pam Rodriguez

(57) ABSTRACT

A brake system for braking a rotatable brake disk includes a primary brake piston engagable with the brake disk and a secondary brake piston engagable with the primary brake piston and operable to move the primary brake piston into engagement with the brake disk. Both pistons are operable in response to fluid pressure. A primary brake valve controls communication of fluid pressure to the primary brake piston. A secondary brake valve controls communication of fluid pressure to the secondary brake piston.

9 Claims, 5 Drawing Sheets

PRIMARY/SECONDARY BRAKE SYSTEM

BACKGROUND

The present invention relates to a brake system having primary and secondary brakes.

Certain jurisdictions, such as Europe, have regulations which require off road vehicles, such as tractors, both primary and secondary brake systems to help stop the vehicle when the vehicle is traveling at a high speed. For example, all tractors sold in Europe are required to have primary service brakes which operate in the rear axle and which are controlled by independent foot pedals. Typically, the foot pedals operate a brake valve which transmits pressurized fluid to brake pistons which clamp the brake disk between the piston and a reaction plate. A secondary brake system is normally located in the front axle and is actuated by a hand lever. The secondary brake system also includes a piston which clamps a brake rotor against a stationary reaction plate.

Especially at high speeds, such a secondary brake system will create frictional drag and power loss, even when the secondary brake is not being applied. Also, such a secondary brake system takes up limited space in the front axle assembly, and it is difficult to include in a front axle assembly a secondary brake which is large enough to handle the heat generated by application of the secondary brake.

SUMMARY

Accordingly, an object of this invention is to provide a secondary brake which is not located in the front axle of the vehicle.

A further object of the invention is to provide such a secondary brake which is located with the primary brake.

These and other objects are achieved by the present invention, wherein a brake system for braking a rotatable brake disk includes a primary brake piston engagable with the brake disk and a secondary brake piston engagable with the primary brake piston and operable to move the primary brake piston into engagement with the brake disk. A portion of the primary brake piston is positioned between the brake disk and the secondary brake piston. Both pistons are operable in response to fluid pressure. A primary brake valve controls communication of fluid pressure to the primary brake piston. A secondary brake valve controls communication of fluid pressure to the secondary brake piston.

DETAILED DESCRIPTION

Figure 1:
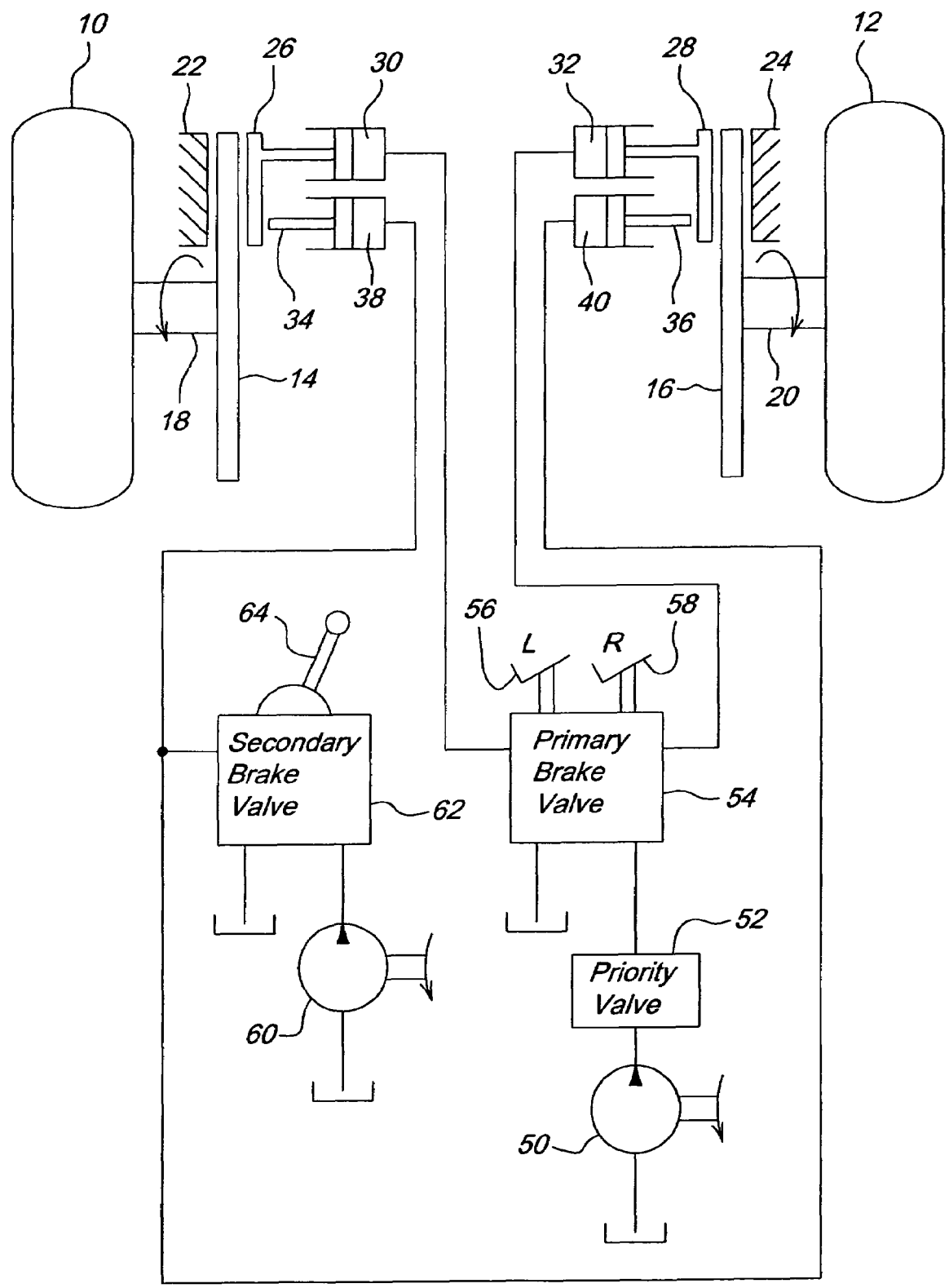
FIG. 1 is a simplified schematic diagram of a brake system according to the present invention.

Referring to FIG. 1, left and right rear wheels 10 and 12 are connected to respective brake disks 14 and 16 by shafts 18 and 20. Non-rotating reaction plates 22 and 24 are positioned adjacent to the brake disks 14 and 16. Primary brake pistons 26 and 28 are movable in response to hydraulic pressure in primary brake piston chambers 30 and 32. Secondary brake pistons 34 and 36 are movable in response to hydraulic pressure in secondary brake piston chambers 38 and 40. Each secondary brake piston 34 and 36 is engagable with the corresponding primary brake piston 26 and 28. A portion of each primary brake piston 26 is positioned between the brake disk 14 and secondary piston 38. A portion of each primary brake piston 28 is positioned between brake disk 16 and secondary piston 40.

The brake system includes a primary hydraulic pump 50 which supplies pressurized fluid via a priority valve 52 to a conventional primary brake valve 54 which is operated by left and right brake pedals 56 and 58. Primary brake valve 54 supplies controlled brake fluid pressure to left and right primary brake piston chambers 30 and 32.

The brake system also includes a secondary hydraulic pump 60 which supplies pressurized fluid to a conventional secondary brake valve 62 which is preferably operated by a hand lever 64. Secondary brake valve 62 supplies controlled brake fluid pressure to left and right secondary brake piston chambers 38 and 40.

Figure 2:
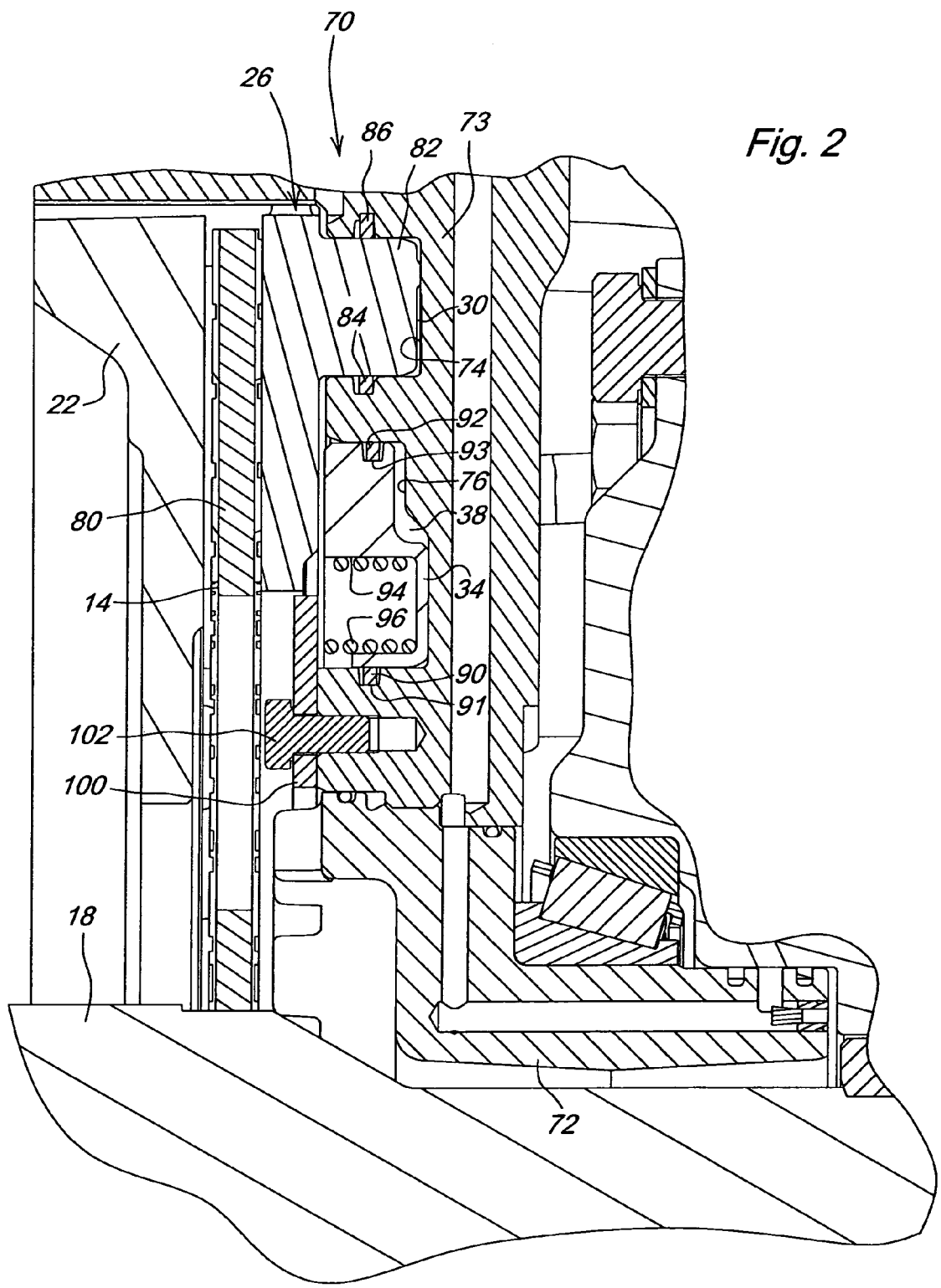
FIG. 2 is a sectional view of a portion of a rear axle assembly incorporating the primary/secondary brakes of the present invention.
Figure 3:
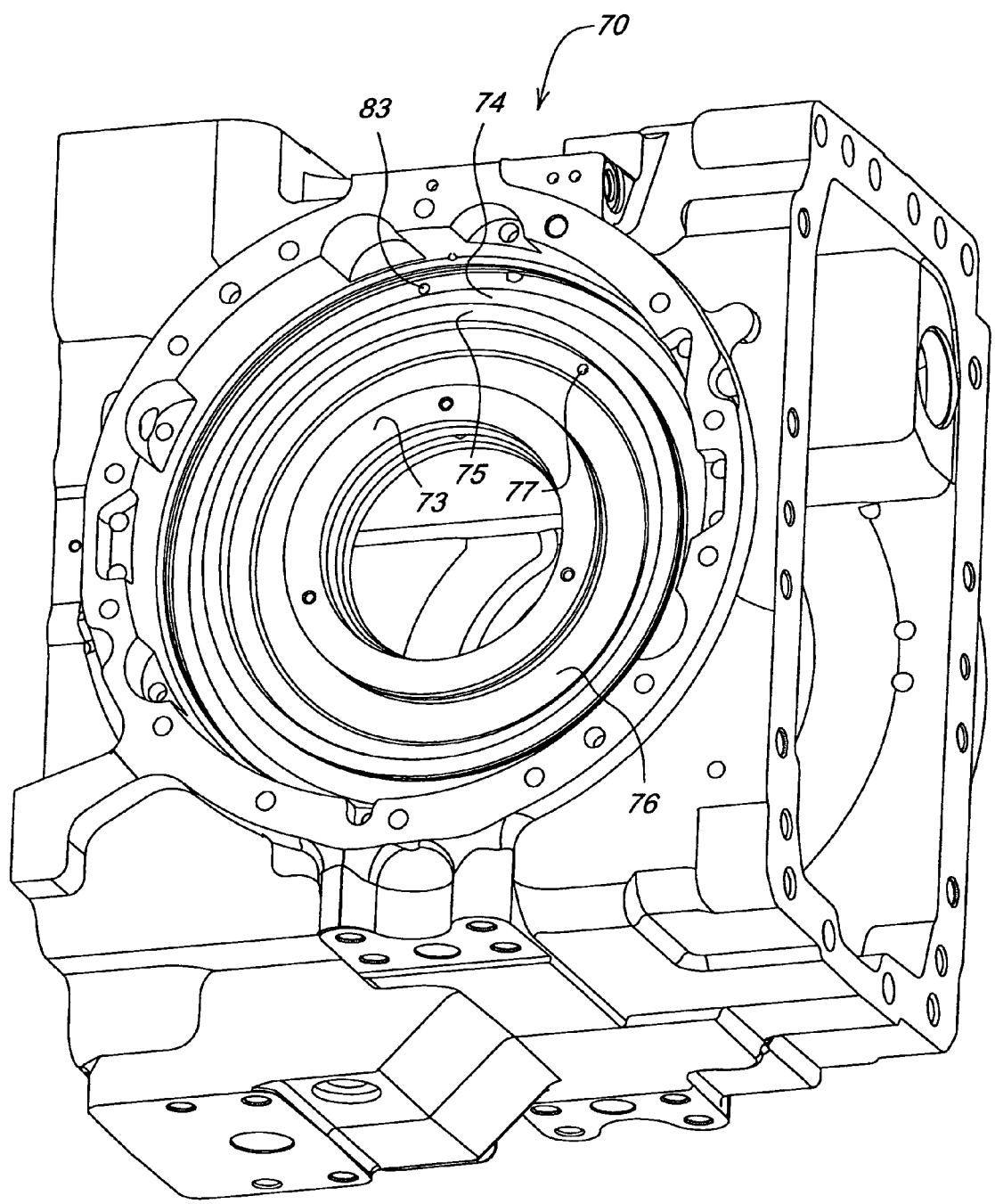
FIG. 3 is a perspective view of a portion of the housing of the rear axle assembly of FIG. 2.

Referring now to FIGS. 2-5, there is shown a portion of a rear axle assembly 70 which is symmetrical about a central rotation axis. The rear axle assembly 70 includes a brake disk or rotor 14 which rotates between reaction plate 22 and a rear axle housing which includes an inner housing portion 72 and an outer housing portion 73. As best seen in FIGS. 2 and 3, housing portion 73 forms a radially outer annular groove 74 and a radially inner annular groove 76. Grooves 74 and 76 are separated by annular land 75.

Figure 4:
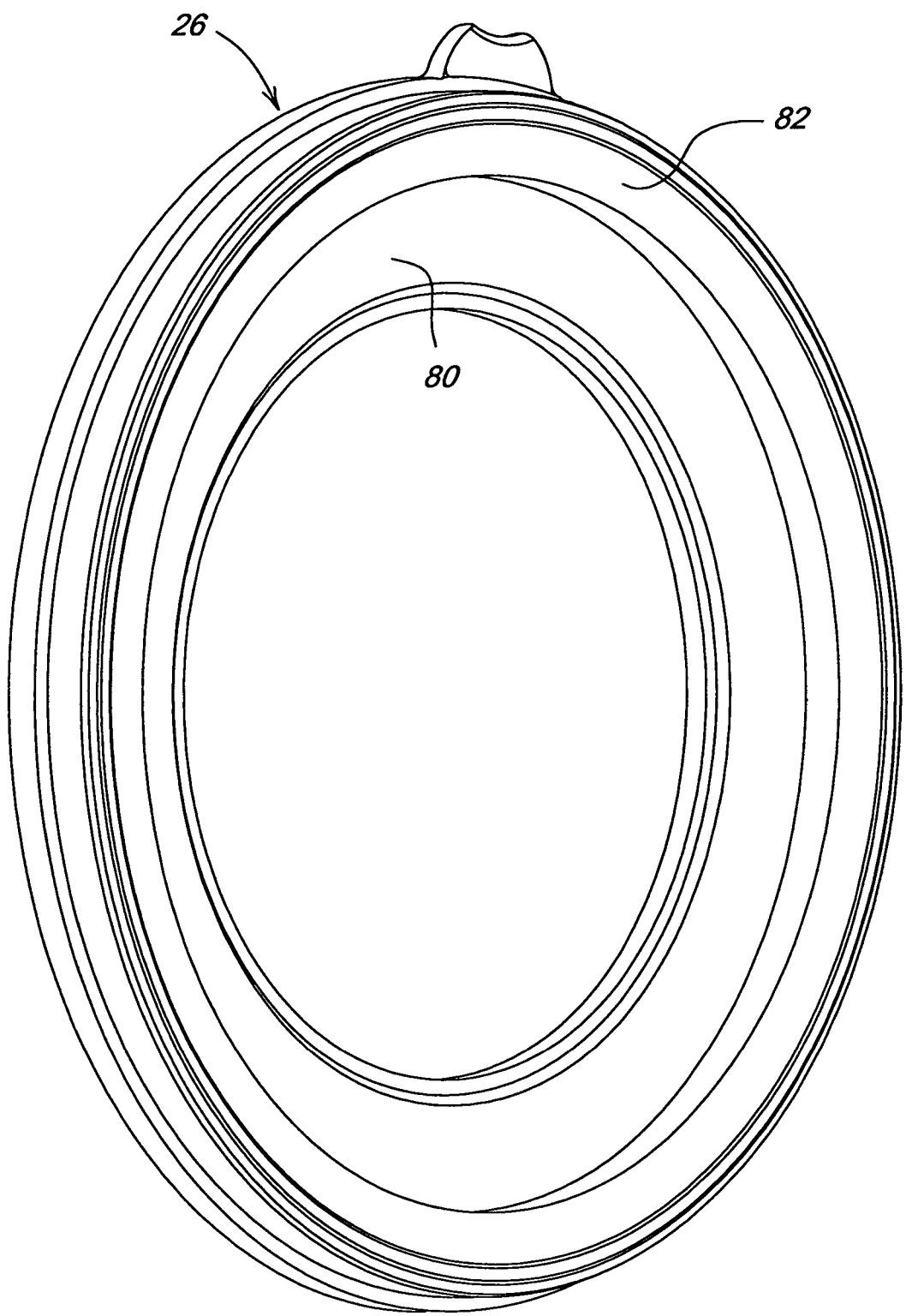
FIG. 4 is perspective view of the primary brake piston of FIG. 2.

As best seen in FIGS. 2 and 4, the primary brake piston 26 is annular and includes an annular plate 80 and an annular flange 82. Flange 82 is positioned near a radial outer edge of plate 80 and projects axially away from plate 80 and from brake disk 14 and into annular groove 74. Seals 84 and 86 are mounted in grooves in the radially inner and outer surfaces of annular groove 74. Flange 82 and groove 74 enclose primary brake piston chamber 30. A passage 83 in the housing portion 73 communicates chamber 30 with primary brake valve 54.

Figure 5:
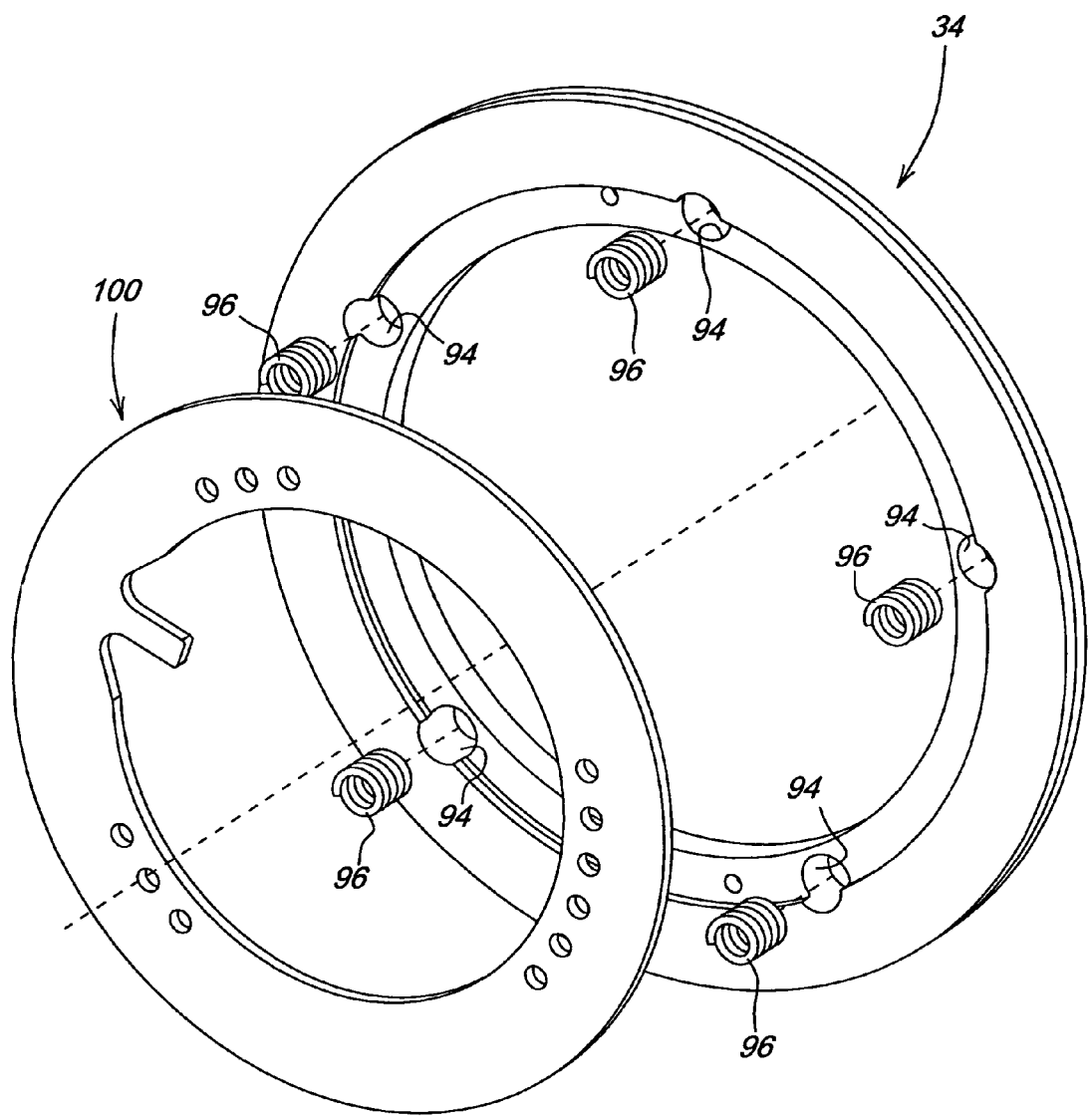
FIG. 5 is perspective view of the secondary brake piston of FIG. 2.

As best seen in FIGS. 2 and 5, the secondary brake piston 34 is annular and has an L-shaped cross sectional shape. Piston 34 is preferably positioned radially inwardly with respect to primary piston 26, and projects axially away from plate 80 and from brake disk 14 and into annular groove 76, which also has an L-shaped cross sectional shape. Seal 90 is mounted in a groove 91 in the radially inner surface of annular groove 76. Seal 92 is mounted in groove 93 in the radially outer surface of piston 34. Piston 34 and groove 76 enclose secondary brake piston chamber 38. A passage 77 in the housing portion 73 communicates chamber 38 with secondary brake valve 62.

A plurality of blind bores 94 are formed in the secondary brake piston 34. The bores 94 open towards the brake disk 14. A spring 96 is mounted in each bore 94. An annular retainer plate 100 is bolted by a plurality of bolts 102 to a face of housing 73. The radially outer portion of plate 100 overlaps a radially inner portion of each bore 94 and overlaps a radially inner portion of the secondary brake piston 34. The plate 100 engages an end of each spring 96 and retains the springs 96 in the corresponding bores 94. The springs 96 are biased to urge the secondary brake piston 34 away from the brake disk 14. Fluid pressure in chamber 38 will urge the secondary brake piston 34 towards the brake disk 14.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A brake system for braking a rotatable brake disk, the brake system comprising:
   a primary brake piston engagable with the brake disk in response to fluid pressure;
   a secondary brake piston engagable with the primary brake piston and operable to move the primary brake piston into engagement with the brake disk in response to fluid pressure;
   a source of pressurized hydraulic fluid;
   a primary brake valve controlling communication of fluid pressure from the source to the primary brake piston; and
   a secondary brake valve controlling communication of fluid pressure from the source to the secondary brake piston, the primary brake piston comprising a plate and a flange which projects away from the plate and from the brake disk, the secondary brake piston engaging the plate, and the plate being located between the brake disk and the secondary brake piston.

2. The brake system of claim 1, further comprising:
   a housing having a first groove and a second groove spaced apart from the first groove, the grooves opening towards the brake disk, the primary brake piston having a piston member slidable in one of said grooves, and the secondary brake piston having a piston member slidable in the other one of said grooves.

3. The brake system of claim 1, further comprising:
   a housing having a radially outer annular groove and a radially inner annular groove, the grooves opening towards the brake disk, the primary brake piston having an annular piston member slidable in one of said grooves, and the secondary brake piston having an annular piston member slidable in the other one of said grooves.

4. The brake system of claim 1, further comprising:
   a housing having a radially outer annular groove and a radially inner annular groove, the grooves opening towards the brake disk, the primary brake piston having an annular piston member slidable in the radially outer annular groove, and the secondary brake piston having an annular piston member slidable in the radially inner annular groove.

5. The brake system of claim 1, wherein:
   the plate comprises an annular plate and the flange comprises an annular flange.

6. The brake system of claim 5, wherein:
   the flange is positioned near a radial outer edge of the plate.

7. The brake system of claim 1, further comprising:
   a housing having a first groove and a second groove spaced apart from the first groove, the grooves opening towards the brake disk, the flange of the primary brake piston being slidable in one of said grooves, and the secondary brake piston having a piston member slidable in the other one of said grooves.

8. A brake system for braking a rotatable brake disk, the brake system comprising:
   a primary brake piston engagable with the brake disk in response to fluid pressure;
   a secondary brake piston engagable with the primary brake piston and operable to move the primary brake piston into engagement with the brake disk in response to fluid pressure;
   a plurality of blind bores formed in the secondary brake piston, said blind bores opening towards the brake disk;
   a source of pressurized hydraulic fluid;
   a primary brake valve controlling communication of fluid pressure from the source to the primary brake piston;
   a secondary brake valve controlling communication of fluid pressure from the source to the secondary brake piston; and
   a plurality of springs, each received in a corresponding one of the bores, each spring being biased to urge the secondary brake piston away from the brake disk.

9. The brake system of claim 8, further comprising:
   a retainer plate mounted adjacent to the secondary brake piston, said plate engaging the springs and retaining the springs in the blind bores.

* * * * *